March 2, 1943. A. OBERHOFFKEN 2,312,355
METHOD OF SCALPING BILLETS
Original Filed July 21, 1938 9 Sheets-Sheet 1

INVENTOR
Alexander Oberhoffken
By Parker, Carlson, Pitzner & Hubbard
ATTORNEYS

March 2, 1943. A. OBERHOFFKEN 2,312,355
METHOD OF SCALPING BILLETS
Original Filed July 21, 1938 9 Sheets-Sheet 2

Fig. 2

INVENTOR
Alexander Oberhoffken
By Parker, Carlson, Pitzner & Hubbard
ATTORNEYS

March 2, 1943.  A. OBERHOFFKEN  2,312,355
METHOD OF SCALPING BILLETS
Original Filed July 21, 1938   9 Sheets-Sheet 3

INVENTOR
Alexander Oberhoffken
By Parker, Carlson, Pitzner & Hubbard
ATTORNEYS

March 2, 1943. A. OBERHOFFKEN 2,312,355
METHOD OF SCALPING BILLETS
Original Filed July 21, 1938 9 Sheets-Sheet 5

March 2, 1943.  A. OBERHOFFKEN  2,312,355
METHOD OF SCALPING BILLETS
Original Filed July 21, 1938  9 Sheets-Sheet 8

INVENTOR
Alexander Oberhoffken
By Parker, Carlson, Pitzner & Hubbard
ATTORNEYS March 2, 1943. A. OBERHOFFKEN 2,312,355
METHOD OF SCALPING BILLETS
Original Filed July 21, 1938 9 Sheets-Sheet 9

INVENTOR
Alexander Oberhoffken
By Parker, Carlson, Pitzner & Hubbard
ATTORNEYS

Patented Mar. 2, 1943

2,312,355

UNITED STATES PATENT OFFICE 2,312,355

METHOD OF SCALPING BILLETS

Alexander Oberhoffken, Birmingham, Mich., assignor to The Ingersoll Milling Machine Company, Rockford, Ill., a corporation of Illinois Original application July 21, 1938, Serial No. 220,467, now Patent No. 2,238,434, dated April 15, 1941. Divided and this application August 1, 1940, Serial No. 349,172

6 Claims. (Cl. 90—11)

The invention relates to the machining of metal work pieces, and more particularly to the surfacing or scalping of metal bars, such as billets, ingots, slabs, and other semi-finished products, to prepare them for subsequent rolling, drawing or other forming operations.

The primary object of the invention is to provide a new and improved method for scalping the side surfaces and beveling the corners of metal bars of generally rectangular cross section, whereby such bars may be prepared for subsequent forming operations in a minimum of time and at relatively low cost.

Another object is to provide an improved method of scalping metal bars quickly and efficiently and with a minimum of handling.

More specifically stated, the improved method aims to permit of insertion of rough billets into loading position, the removal of finished billets, or the performance of various preparatory operations on partially finished billets while one billet is being machined or is occupying the final work positioning, thereby increasing the production capacity of the equipment used.

Other objects and advantages of the invention will become apparent from the following detailed description of the preferred embodiment illustrated in the accompanying drawings, in which.

While the improved method is susceptible of various modifications, it may be carried out by various forms of apparatus and performed on various kinds of billets and it has been shown and will be described as applied to the scalping and beveling of bars or billets 25 (Figs. 3 and 10–19) of substantially square cross section. This operation involves the machining or scalping of all four sides of the bar to remove slag, hard scaly particles or other surface irregularities and machining or beveling of corners which tend to produce folds or seams in the finished product.

The apparatus herein shown for carrying out the scalping and beveling operation comprises generally a metal removing unit such as a milling machine of conventional construction and a billet handling mechanism assembled together in a unitary structure. To obtain maximum efficiency, it is preferred to employ a metal removing unit having two tool heads arranged to operate simultaneously on opposite sides of the work piece and thus finish two side surfaces and two corners of the work piece in each passage of the same through the unit.

Bars or billets of the type for which the present machine is designed are large and relatively heavy, and the handling of such bars has heretofore been a slow and expensive operation. To avoid these difficulties, the billet handling mechanism is accordingly arranged for power operation and preferably includes power-actuated transfer, positioning, and turning mechanisms whereby the billets can be handled quickly and efficiently by a minimum number of attendants.

Figure 1:
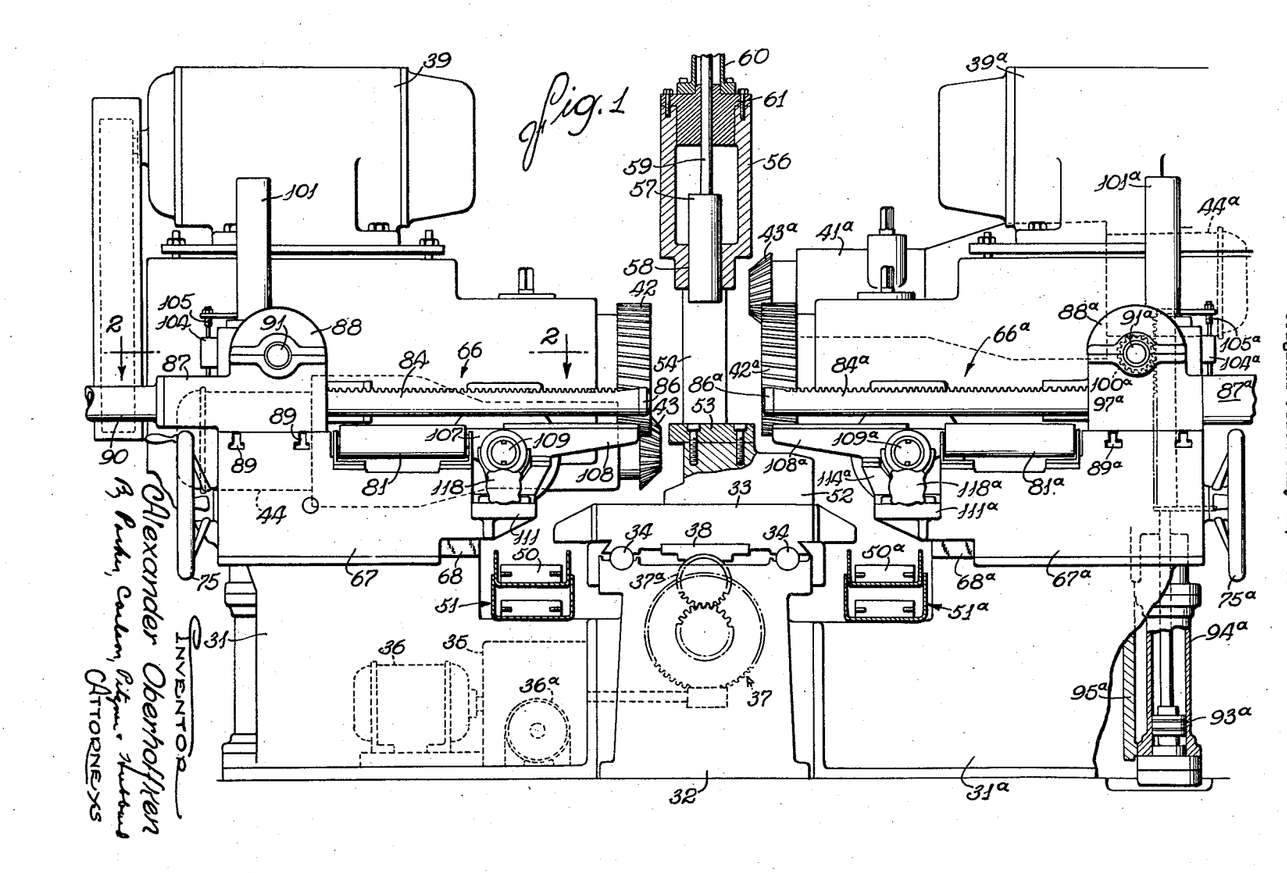
Figure 1 is a front end elevation of one form of scalping apparatus in which the improved method may be carried out.

Referring to Fig. 1 of the drawings, the metal removing unit of the machine selected for illustration comprises a base consisting of side frames 31 and 31ª disposed on opposite sides of an elongated central frame section 32. The section 32 forms a bed for a translatory table or work support 33 which bed extends forwardly to provide a loading station at which the work pieces may be placed on and removed from the table. In the particular machine shown, the table 33 is supported for reciprocation longitudinally of the bed by means of tubular guides 34. Preferably, the table is driven selectively in either direction at a rapid traverse or at a slow feed by a rapid traverse motor 36 and a feed motor 36ª through a speed reduction mechanism 35, suitable gearing 37 and a screw 37ª which cooperates with a nut 38 attached to the table.

Mounted to slide horizontally on the respective frame sections 31 and 31ª on opposite sides of the work table 33 rearwardly of the loading station are a pair of multiple spindle tool heads 41 and 41ª. The tool head 41 is equipped with a face milling cutter 42 driven by a motor 39 and an angular or beveled milling cutter 43 driven by a motor 44 in well known manner. The cutter 42 is mounted on the head for independent axial adjustment and the cutter 43 is adjustable axially as well as vertically to determine the amount of bevel. The position of the cutters is such that the cutter 42 removes a thin layer of metal from the side surface of the work piece while the cutter 43 bevels the adjacent lower edge as the work piece is traversed past the tools. The head is thus supported for movement toward and from the table 33 to permit retraction of the tools when the table is returned to the loading station. In the machine illustrated, movement of the head is effected by a piston 45 operating in a cylinder 46 and operatively connected with the head by a piston rod 47. Similar mechanism including a piston 45ª, cylinder 46ª and piston rod 47ª is provided for the right-hand head 41ª. Pressure fluid is supplied to the cylinders 46 and 46ª by a pressure fluid pump 48 (Fig. 9) under control of a valve V—1 having a plunger 49 shiftable to alternate positions by solenoids VS—1 and VS—2. A similar valve V—1ª actuated by solenoids VS—1ª and VS—2ª controls the supply of pressure fluid to cylinder 46ª of the right-hand head 41ª.

The right-hand head 41ª is equipped with cutters 42ª and 43ª similar to the cutters 42 and 43 and driven by suitable motors 39ª and 44ª. It will be observed, however, that the relative positions of the cutters 42ª and 43ª differ from the positions of the cutters on the head 41 in that the angular cutter 43ª is disposed above the axis of the cutter 42ª so as to operate on the adjacent upper edge of the work piece. This arrangement of the tools makes it possible to machine the four sides and the four corners of the billet in two passes of the billet past the metal removing units, the billet being turned on its longitudinal axis through an angle of ninety degrees after the first passage. Other arrangements of the cutters may, of course, be employed.

Figure 6:
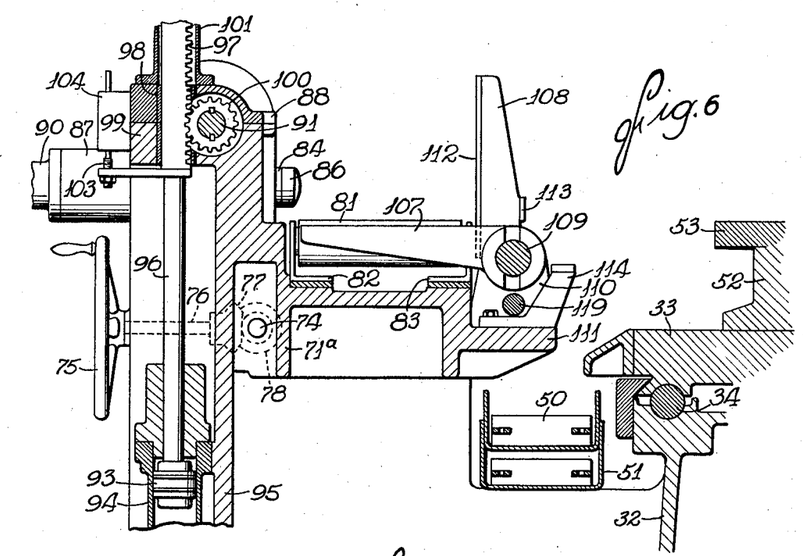
Fig. 6 is a fragmentary vertical section of the turning mechanism taken along the line 6—6 of Fig. 2.

Suitable means is provided for carrying away the metal chips removed from the work pieces. As herein shown, this means comprises a pair of conveyors, preferably of the endless chain type having vanes 50 and 50ª operating in channel-shaped metal troughs 51 and 51ª arranged on opposite sides of the central frame section 32 below the side edges of the work table 33 as shown in Figs. 1 and 6. These conveyors may be driven in any suitable manner so as to keep the metal removing unit free of chips while the machine is in operation.

In order to hold the work rigid while the cutters of the metal removing unit are performing their scalping and beveling operations, the work table 33 may be equipped with a suitable fixture embodying means for clamping the work piece securely in place. As herein shown, the fixture includes a base 52, which may vary in thickness to accommodate different sizes of billets, bolted or otherwise rigidly secured to the table 33. The base carries a horizontally disposed platform 53 for supporting the work piece. Rising from opposite ends of the base are vertical columns 54 and 55 connected at their upper ends by a rigid horizontal bridging member 56 which serves to support the work clamping. The bridging member is disposed above the platform 53 and spaced therefrom so as to provide sufficient room for a billet 25 to be placed on the platform.

Figure 3:
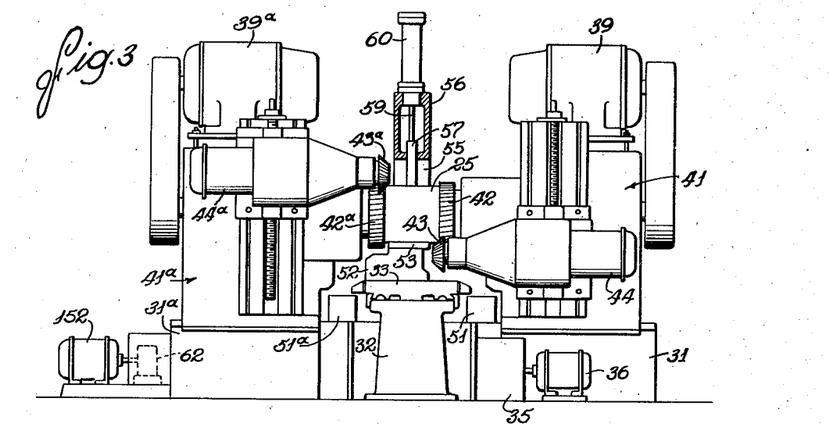
Fig. 3 is a rear end elevation of the machine.
Figure 8:
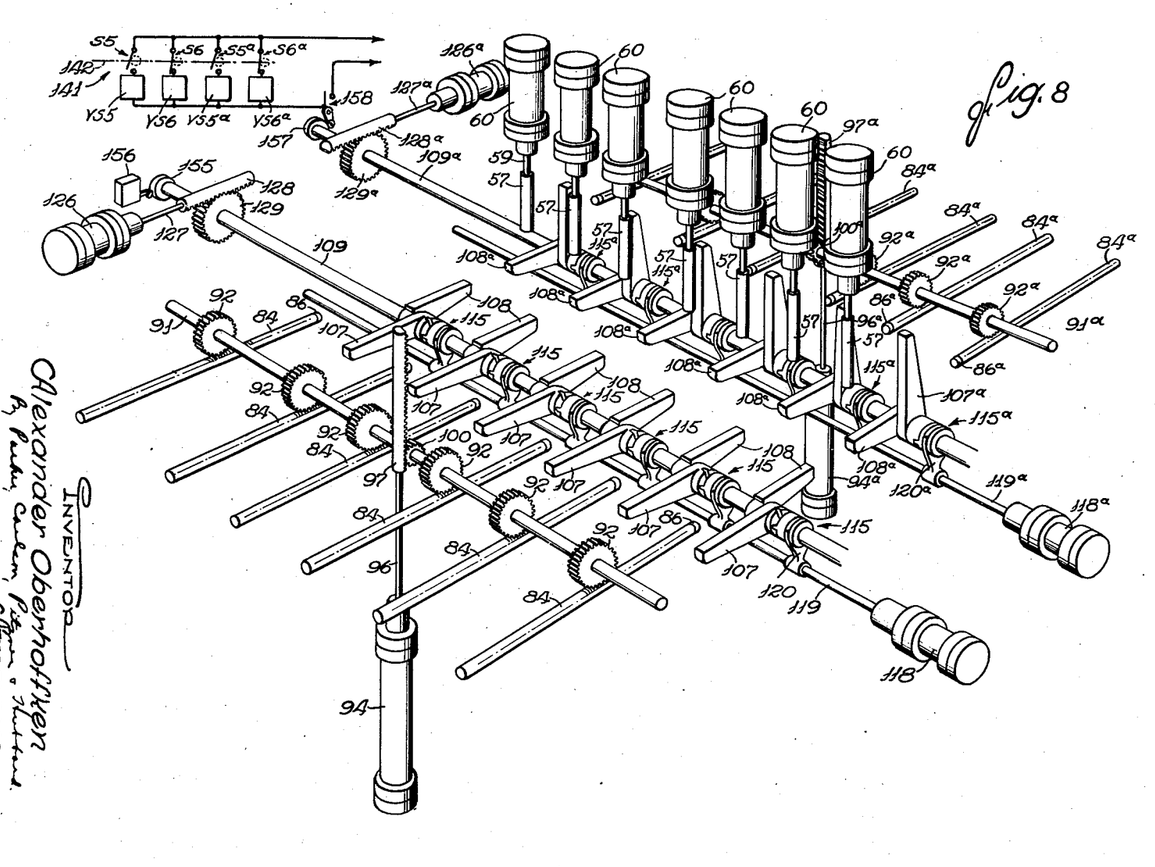
Fig. 8 is a fragmentary perspective view of the hydraulic means for operating the transfer mechanism, the turning mechanism, and the billet clamping mechanism.
Figure 9:
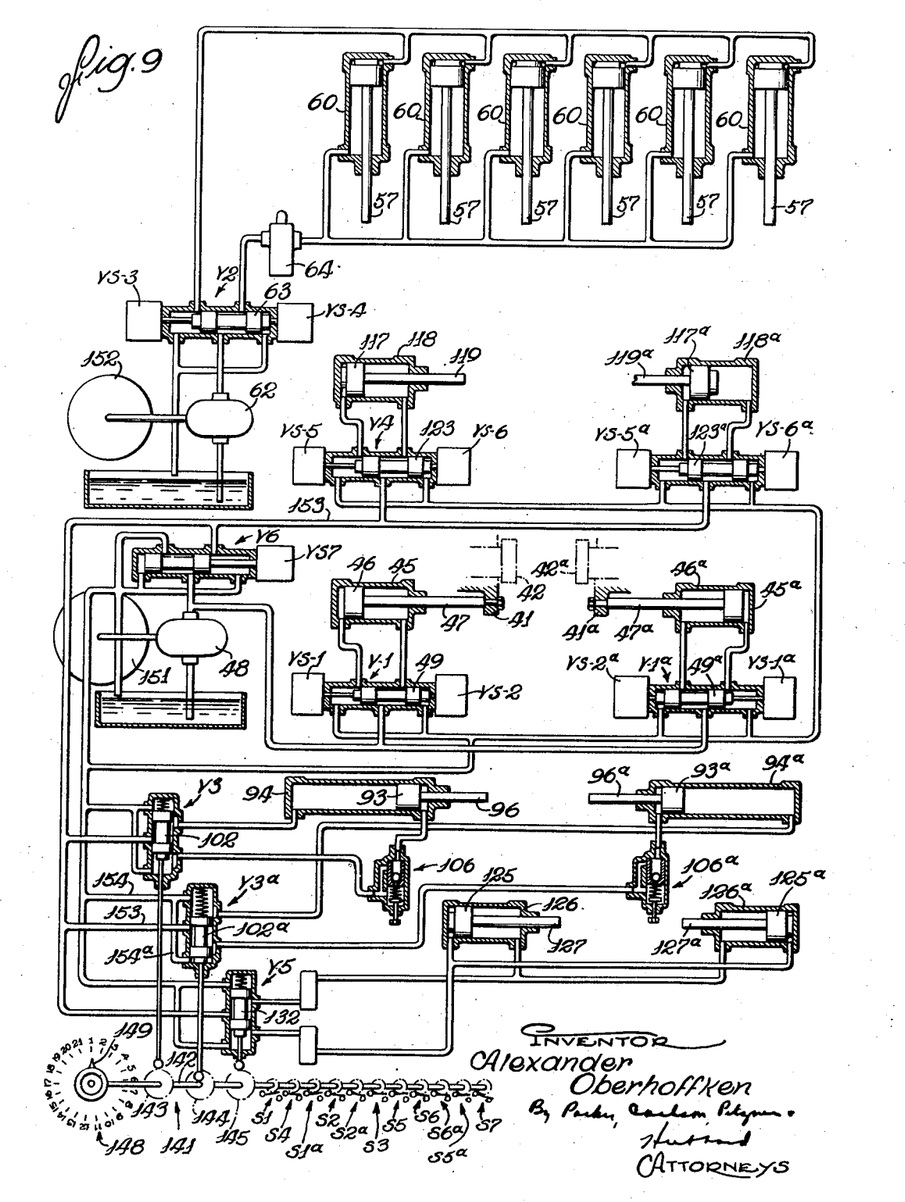
Fig. 9 is a diagrammatic view of the hydraulic operating and control circuits of the machine.

While the billets may be clamped on the table in any desired way, it is preferred to utilize an hydraulically-operated mechanism. As shown in Figs. 1, 3, and 9, the clamping means comprises a series of vertically disposed plungers 57, each guided for movement toward and from the platform 53 by a bearing 58 carried on the bridging member 56. Each plunger 57 is connected by a piston rod 59 with a piston operating in a cylinder 60 closed by a cap 61 bolted or otherwise secured to the bridging member 56 directly above the associated bearing 58. Seven of the plungers 57 and associated cylinders 60 are provided in the machine illustrated (see Fig. 8), although it will be understood that the number may be varied according to the character of the work pieces to be operated on.

Pressure fluid is supplied to the cylinders 60 by a pressure fluid pump 62 (Fig. 9) under control of a valve V—2 having a plunger 63 shiftable to either of two positions by solenoids VS—3 and VS—4. Thus, when the valve plunger is shifted to one position by the solenoid VS—3, pressure fluid is introduced into the upper end of the cylinders 60 and the plungers are forced downwardly into engagement with the work piece 25 as shown in Fig. 3, to clamp the same rigidly to the platform 53. To release the work piece, the valve plunger 63 is shifted to its other position by the solenoid VS—4 whereby pressure fluid is introduced into the lower end of each cylinder 60 to withdraw the plungers from engagement with the work. A check valve 64 interposed in the hydraulic circuit leading to the lower ends of the clamping cylinders serves to counteract the weight of the pistons, rods and plungers.

The billet-handling mechanism is constructed and arranged so as to permit large and heavy billets to be handled with ease with a minimum number of attendants. To this end, it includes suitable runways or conveyors alongside the table bed for carrying billets to and from the loading station, power operated means for transferring billets between the runways and the work table, and means for turning the billets on their longitudinal axes through an angle of ninety degrees so that the different side surfaces may be presented in operative relation to the tools of the metal removing units.

The billet-handling mechanism in its preferred form comprises duplicate units 66 and 66ª disposed on opposite sides of the loading station, that is, the table when retracted away from the metal removing units. For convenience of identification, the loading units 66 and 66ª will be referred to hereinafter as the left hand unit and right hand unit, respectively. While the operating units are structurally separate in the present instance, their actions are coordinated to enable them to cooperate in transferring work pieces to and from the work table 33 and in positioning the work accurately thereon for proper engagement with the metal working tools.

Figure 2:
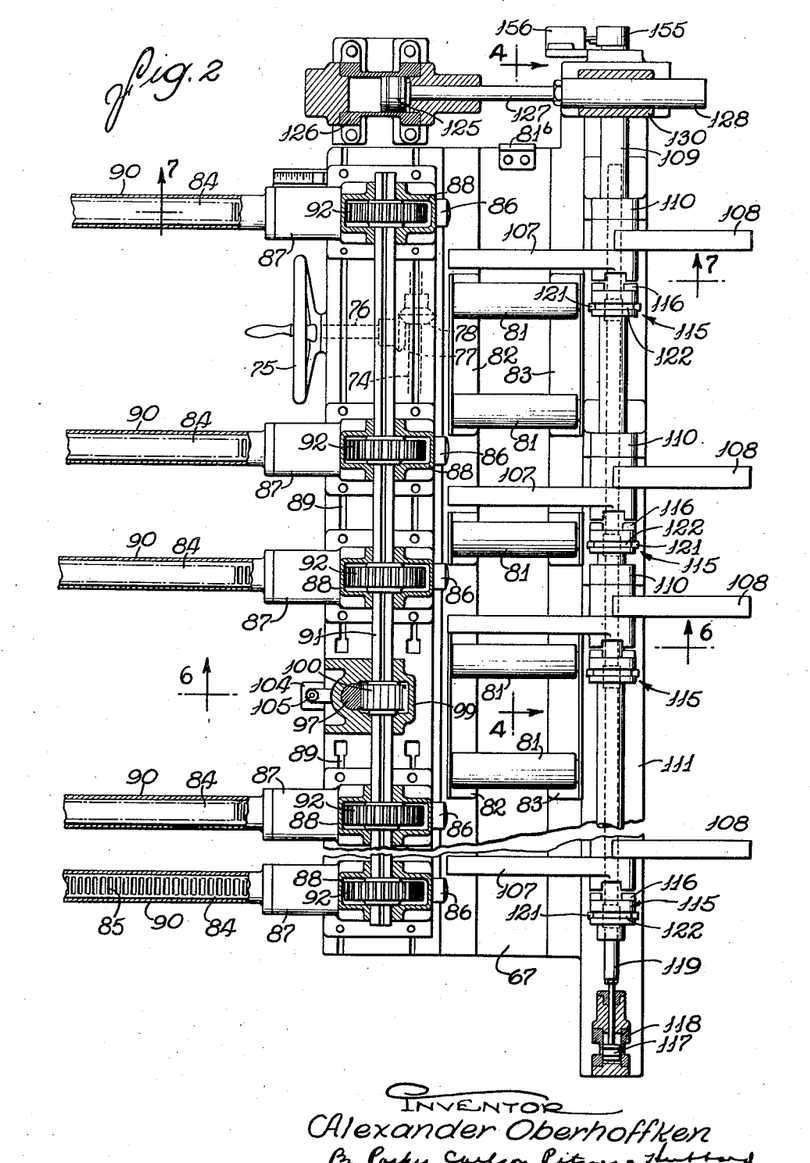
Fig. 2 is a fragmentary plan view of the billet transfer and turning mechanism taken along the line 2—2 of Fig. 1.
Figure 7:
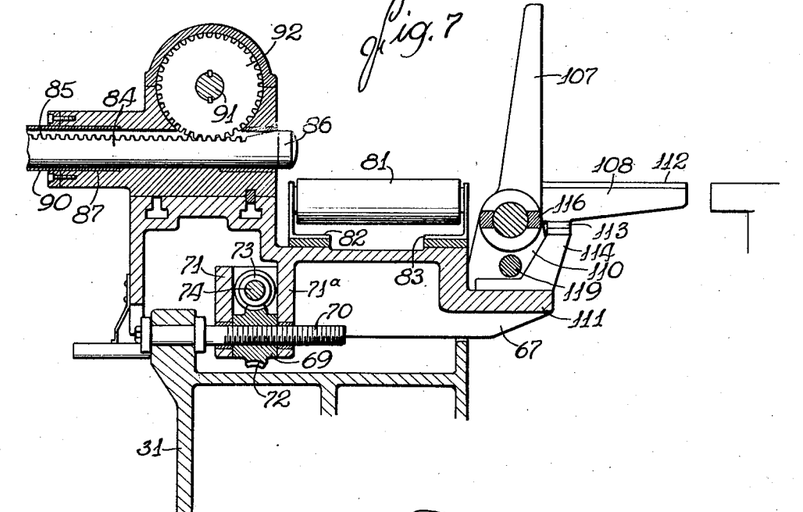
Fig. 7 is a fragmentary vertical section of the turning mechanism taken on the line 7—7 of Fig. 2.

Referring to Figs. 1, 2, and 7, the left-hand unit 66, as herein shown, comprises generally a rigid frame or base 67 which serves as a support for a billet conveyor or runway, billet transfer mechanism, and billet turning mechanism. In order to accommodate billets of different thickness, the operating unit as a whole is preferably adjustably supported for movement toward or from the work table 33. To this end, the base 67 is mounted on transverse ways 68 formed on the forward end of the frame section 31 at one side of the loading station. A scale (not shown) is provided to enable the base to be set for a billet of selected size.

Adjustment of the left-hand unit is effected, in the present instance, by means of a nut 69 cooperating with a screw 70 anchored to the frame section 31. The nut is held against endwise movement relative to the operating unit by vertical webs 71 and 71ª depending from the underside of the base 67 and engaging the opposite ends of the nut. The periphery of the nut is formed with teeth 72, thus constituting a worm wheel engageable with a worm 73 fast on a horizontal shaft 74 journaled on the base 67. Rotation of the shaft 74 is preferably effected manually through the medium of a handwheel 75 (Fig. 6) fast on one end of a shaft 76 which carries a bevel gear 77 meshing with a bevel gear 78 keyed to the shaft 74. Thus, by turning the handwheel 75, the base 67 and the entire operating unit 66 may be moved toward or from the work table 33.

The conveyor or runway, which also constitutes an element of the operating unit, is provided for moving billets into position for loading on the work table, and likewise for receiving billets after discharge from the machine. As herein shown, the runway is disposed generally centrally of the base 67 and parallel to the reciprocatory path of the work table 33. To facilitate movement of the billets into or out of loading position, the runway is preferably equipped with rollers 81 journaled on angular brackets 82 and 83 bolted or otherwise secured to the base 67. Any suitable means, such as a conveyor or the like, may be utilized for delivering billets to the runway and for removing them therefrom. Movement of a billet into proper loading position on the rollers 81 is limited by a stop 81ᵇ (Fig. 2).

The structure above described for the left-hand unit 66 is duplicated in the right-hand unit 66ª, and a detailed description of the latter unit is therefore unnecessary. However, for convenience of identification corresponding parts of the unit 66ª have been designated by similar reference characters with the suffix "a" added.

Figure 21:
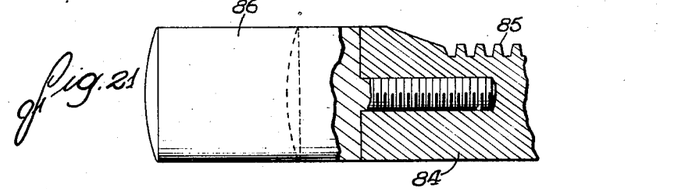
Fig. 21 is a view partly in section showing details of construction of the billet push rods.

The transfer of billets from the runway to the work table and vice versa is effected by the transfer mechanism which, as herein shown, comprises a series of transfer members in the form of push rods 84 (Figs. 1 and 7) supported on the base 67 at one side of the runway for movement in a horizontal plane transversely of the runway. The push rods are all alike, each comprising an elongated body of generally rounded cross section having rack teeth 85 cut in one side for a purpose to be described presently. The forward end of the push rod, that is, the end adjacent the runway, terminates in a removable tip 86 (Fig. 21) preferably rounded so as not to mar the surface of the work. Since the tips are removable, they may be readily replaced when worn, or tips of different lengths may be used interchangeably to adapt the mechanism for transferring and positioning billets of different sizes and shapes.

Referring more particularly to Figs. 1 and 7, each push rod 84 is slidably supported for endwise movement in an elongated bearing 87 formed integrally with a housing 88 secured to the base 67 at one side of the runway. Preferably, the housings 88 of the respective push rods are secured in place on the base by means of headed bolts operating in T-slots 89 which permit convenient adjustment of the relative spacing of the rods. The transfer mechanism can therefore be adjusted readily for operation on billets of different lengths. In order to protect the bearing surfaces of the push rods from dirt or other foreign matter and for purposes of safety, the rearwardly projecting ends of the rods are enclosed in tubular casings 90 projecting outwardly from the bearings 87.

Common actuating means is provided for advancing and retracting the push rods 84 in unison. To this end, a shaft 91 is arranged transversely above the series of push rods, said shaft being journaled in each of the housings 88. Enclosed in each housing and having a splined driving connection with the shaft 91 is a pinion 92 meshing with the rack teeth 85 of the associated push rod. Thus, upon rotation of the shaft 91 in one direction, the push rods will be advanced or projected toward the runway and work table while upon rotation of the shaft in the other direction the rods will be retracted.

While any suitable actuator may be employed for rotating the shaft 91, it is preferred to employ hydraulic means for this purpose for the reasons hereinbefore explained. Herein, the actuator comprises a piston 93 (Fig. 6) operating in a vertically disposed cylinder 94 secured to a depending portion 95 of the rear web 71 of the base 67. The piston 93 is connected by a piston rod 96 with a rack 97 slidably supported and guided in a suitable bearing 98 carried on a bracket 99 projecting upwardly from the base 67. The rack 97 is arranged to mesh with a pinion 100 keyed to the shaft 91. A tubular sleeve or guard 101 encloses the upper end of the rack to protect the bearing surfaces from dirt or other foreign material.

Pressure fluid is supplied to the cylinder 94 by the pump 48 under control of a reversing valve V—3 (Fig. 9) having a plunger 102 shiftable between two positions. With the valve in one position, pressure fluid is admitted to the lower end of the cylinder whereby the piston 93 is forced upwardly and its associated rack operates to rotate the shaft 91 in a clockwise direction as viewed in Fig. 6, and retract the push rods 84 to withdrawn position. Upon shifting of the valve plunger 102 to the other position, pressure fluid introduced into the upper end of the cylinder moves the piston in the opposite direction to advance the push rods toward the work table whereby to push the billet from the runway onto the table. A stop screw 103 carried by the rack 97 engageable with a fixed stop 104 on the frame structure serves to limit the upward stroke of the piston and thus determines the extent of rearward movement of the push rods. This limit position may be adjusted as required by varying the position of the screw 103. The outward movement of the push rods 84 is determined by a stop screw 105 attached to the upper end of the rack 97 (Fig. 1) which also cooperates with the stop 104 thus confining the travel of the push rods within fixed limits.

A separate control valve V—3ª is provided for controlling the supply of pressure fluid to the cylinder 94ª for advancing and retracting the push rods 84ª of the companion operating unit 66ª. This valve, like the valve V—3, has a plunger 102ª adapted to be shifted between two positions in timed relation to the operation of the other valves of the machine. The transfer mechanism, in addition to their transfer function, are also utilized to position the work piece or billet on the work table and to hold it securely in position until the billet clamping means is brought into action. To this end, the push rods of each operating unit are initially advanced to engage a billet, and then the pressure on one set of push rods is partially relieved to enable the other set to move the work into the desired final position. Sufficient pressure is maintained on said one set of push rods to hold the work securely in contact with the ends of the other push rods, thereby insuring extremely accurate positioning of the billet. The means for accomplishing this result includes a ball check valve 106 interposed in the hydraulic circuit of the operating cylinder 94 as will appear presently.

The billet turning mechanism which constitutes the third mechanism of the operating unit is preferably disposed between the billet runway and the loading station of the metal removing unit so that billets can be transferred from one to the other by simply shifting them laterally. The turning mechanism in its preferred form comprises a series of radially extending arms 107 and 108 arranged in opposed pairs upon a common rock shaft 109 as shown in Figs. 1, 2, 6, 7, and 8. As herein shown, the shaft 109 extends generally parallel to the billet runway and is journaled in suitable bearings carried by brackets 110 bolted or otherwise rigidly secured to a horizontally disposed shelf or ledge 111 projecting from the forward end of the base 67. The shaft is so positioned that the arms 107 when rocked to a horizontal position extend across the runway with their upper surfaces disposed in a plane slightly below the plane defined by the upper edges of the rollers 81. With the arms in this position, billets may be moved along the runway without interference from the turning mechanism.

The companion arms 108 of the several pairs are arranged to extend across the gap between the runway and the work receiving platform 53 and the table 33. They thus provide a slideway for the transfer of billets laterally of their lengths from the runway onto the table. As will be seen by reference to Fig. 6, the arms 108 are formed with a flange or bearing surface 112 along one edge, which flange is adapted to lie in the same plane as the rollers 81 and the table platform 53 when the arm is rocked to a horizontal position as shown in Fig. 1. In order to support the arm in this position and to avoid placing undue strain upon the shaft 109 and associated parts, the arm is formed with an abutment 113 adapted to rest on a supporting bracket 114 carried on the ledge 111.

When the turning mechanism is used for turning billets, the arms 107 and 108 of each pair are preferably angularly spaced ninety degrees apart so that one arm serves to lift the billet from its resting place, while the other arm prevents the billet from sliding out of position during the turning operation and also acts to lower the billet in a manner such as to prevent marring of the same or damage to the machine. In order to prevent the arms from interfering with the transfer of billets from the runway to the work table and vice versa, means is provided whereby both arms may be positioned simultaneously in the same horizontal plane as shown in Fig. 1. To this end, one arm of each pair is disengageably associated with the shaft 109 while the other arm may be rigidly secured to the shaft.

Figure 4:
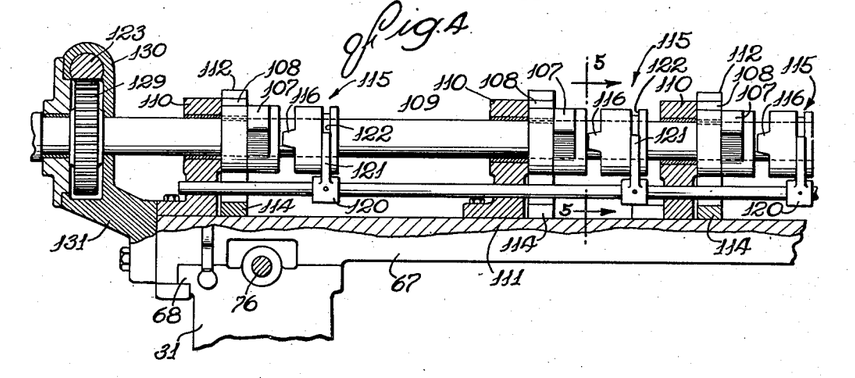
Fig. 4 is a fragmentary sectional view of the billet turning mechanism taken along the line 4—4 of Fig. 2.
Figure 5:
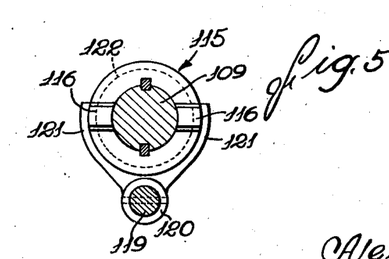
Fig. 5 is a transverse sectional view taken along the line 5—5 of Fig. 4.

In the particular mechanism shown in Figs. 2 and 4, the arm 108 of each pair is keyed to the shaft 109, while the arm 107 is disengageably connected with the shaft by means of a positively acting clutch including a shiftable clutch element 115 in the form of a sleeve slidably but non-rotatably mounted on the shaft. The face of the clutch element 115 is formed with diametrically disposed lugs or clutch teeth 116 adapted to engage in correspondingly shaped radial slots in the adjacent face of the arm 107. Thus, by shifting the clutch elements 115 longitudinally of the shaft 109, the arms 107 may be operatively connected with the shaft for rotation therewith. When the clutch elements are disengaged when the arms 107 are in the position shown in Fig. 6, the shaft may be rotated to position the companion arms in a horizontal position without disturbing the first mentioned arms. Thus, a clear path is provided for the transfer of a billet from the runway to the work table.

The shifting of the clutch elements 115 into or out of engagement with the turning arms 107 may be effected by any suitable means. As herein shown, hydraulic means is employed, this including a piston 117 (Fig. 2) operating in a cylinder 118 mounted on the base 67 adjacent one end of the shaft 109. The piston is suitably connected with a clutch shifting bar 119 (Fig. 4) which extends parallel to the shaft 109 and which is slidably supported in bearings formed in the supporting brackets 110 immediately below the shaft. Pinned to the bar 119 adjacent each clutch element 115 is an operating member 120 having spaced arms 121 engaging in a peripheral groove 122 in the element 115. The clutch elements 115 are thus free to rotate with the shaft and are movable longitudinally of the shaft upon corresponding movements of the shifting bar 119.

Pressure fluid is supplied to the cylinder 118 by the pump 48 through a control valve V—4 having a plunger 123 shiftable to alternate positions by solenoids VS—5 and VS—6. A separate valve V—4ª having operating solenoids V—5ª and V—6ª controls the supply of pressure fluid to the cylinder 118ª for actuating the clutches of the companion operating unit 66ª. The operation of these valves will be described in detail in connection with the description of the hydraulic circuit of the machine.

Rotation of the shaft 109 to rock the arms 107 and 108 for turning the billet is effected in the present instance by hydraulically actuated means including a piston 125 (Fig. 2) operating in a cylinder 126 supported at the rear of the base 67. The piston 125 is connected by a piston rod 127 with a rack 128 engaging a pinion 129 keyed to the shaft 109, as shown in Fig. 4. A housing 130, formed on a bracket 131 bolted or otherwise rigidly secured to one end of the base encloses the pinion and acts as a support and guide for the rack.

The right hand unit 66ª is equipped with turning mechanism similar in all respects to the mechanism of the unit 66 including the hydraulic cylinder 126ª and piston 125ª for rotating the turning arm rock shaft 109ª. Pressure fluid is supplied to the cylinders 126 and 126ª by the pump 48 through a common control valve V—5 having a plunger 132 shiftable between two positions whereby the mechanisms are operated in unison.

The operation of the machine will be readily understood by reference to the control system the essential elements of which are illustrated in diagrammatic form in Fig. 9. The complete hydraulic system of the machine has been shown together with such portions of the electrical equipment as are essential to an understanding of the operation. The control circuits and apparatus for the metal removing units have been omitted from the drawing since these are old and well known. Further, the mechanism for controlling the sequence of the operations of the various electrical switches and valves is merely illustrative, and it is to be understood that any suitable mechanism may be employed for this purpose. Also, different numbers of positions of the main controller may be employed or a different sequence of operations may be used depending on the character of the work to be done.

The control system is arranged with a particular view of enabling the scalping and beveling operation to be performed on billets of generally rectangular cross section in accordance with a novel method which utilizes the machine equipment to best advantage and which reduces handling of the billets to a minimum. In accordance with this method, a billet is given an initial pass through the metal removing unit thereby simultaneously scalping opposite sides and beveling diagonally opposite corners. The billet is then turned about its longitudinal axis through an angle of ninety degrees and passed through the metal removing unit in this new position. In the second pass, the other two sides of the billet are scalped and the other two corners are beveled, thus completing the surfacing of the billet in two passes through the machine.

To avoid unnecessary handling of the billets, transfer of a partially or a completely machined billet from the work table to the turning mechanism is effected simultaneously with and as an incident to the transfer of a billet from one of the runways or turning mechanisms to the work table. In other words, as one billet is pushed onto the work table, the partially or fully machined billet previously operated on is pushed off the table and onto the turning mechanism. In case the first billet is only partially machined, it is turned through an angle of ninety degrees, and after the second billet has completed its first passage through the metal removing unit, the said first billet is pushed back onto the work table, while the partially machined second billet is discharged onto the turning mechanism. After the second passage of the first billet through the metal removing unit and when the billet is completely machined, it is transferred from the work table to the turning mechanism while the second billet is transferred to the work table. The first billet is then removed from the machine in any suitable manner while the third billet is positioned on the runway and so on until the entire lot of billets is machined to finished condition.

The particular control system illustrated is designed for an operating program in which a complete operating cycle of the machine is executed in twenty-one distinct steps. These steps are initiated in proper sequence by a sequence controller indicated generally at 141 (Figs. 8 and 9) which may be of any suitable character. For the purpose of illustration, the controller is shown as including a cam shaft 142 on which are mounted suitable cams 143, 144 and 145 for operating the valves V—3, V—3ª and V—5, and a series of cams 146 for actuating electrical switches S—1, S—1ª, S—2, S—2ª, S—3, S—4, S—5, S—5ª, S—6, S—6ª and S—7 to control the various solenoid operated valves. The cams are shaped so as to exert their controlling actions in different angular positions of the cam shaft, there being twenty-one such positions, or one for each step in the machine cycle. For the convenience of the attendant, these steps are indicated by numerals 1-21 on a dial 148 with which a pointer 149 on the cam shaft cooperates. Means, of a character well known in the art but not shown herein, may be incorporated with the above control to interlock or prevent the operator from selecting the wrong sequence or from reversing the sequence.

An operating cycle of the machine will now be described to illustrate the preferred method of carrying out the scalping and beveling operation, reference being had to Figs. 9 to 19, inclusive, of the drawings. Preliminarily, to begin an operating cycle, the driving motors 39, 39ª, 44 and 44ª of the metal removing unit are started in the usual manner. Motors 151 and 152, which drive the pressure fluid pumps 48 and 62, respectively, are also started so as to provide a supply of pressure fluid in the hydraulic system. It will be understood that the work table 33 is stopped in retracted or loading position at this time.

The sequence control device or cam shaft 142 is located in the first position in which switches S—2, S—2ª, S—4, S—6, S—6ª and S—7 are closed. Plungers 102 and 132 of valves V—3 and V—5 are shifted to their upper positions, and plunger 102ª of valve V—3ª is shifted to its lower position as shown in Fig. 9. Upon application of energizing current, the switch S—7 energizes the solenoid VS—7 which opens main valve V—6 to direct pressure fluid from the pump 48 into a supply line 153 leading to the various control valves. Closure of the remaining switches energizes the valve operating solenoids VS—2, VS—2ª, VS—4, VS—6 and VS—6ª which operate their associated valves V—1, V—1ª, V—2, V—4 and V—4ª to the positions shown in Fig. 9. With the valves thus set, the clamping plungers 57 are withdrawn to unclamping positions, the tool heads 41 and 41ª of the metal removing units are retracted, the clutches 115 of the left hand turning mechanism are disengaged, and the clutches 115ª for the right hand turning mechanism are engaged.

Figure 10:
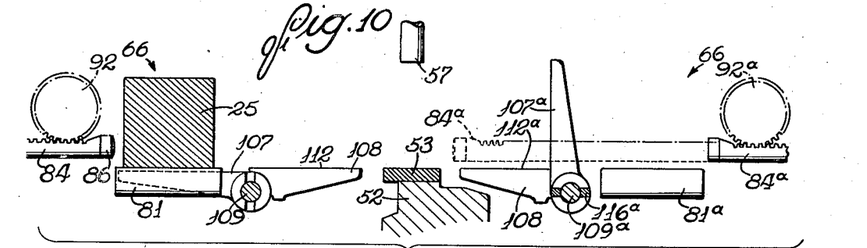
Figs. 10 to 19, inclusive, are diagrammatic views showing the various steps in the improved method of scalping and beveling billets in accordance with the present invention.
Figure 11:
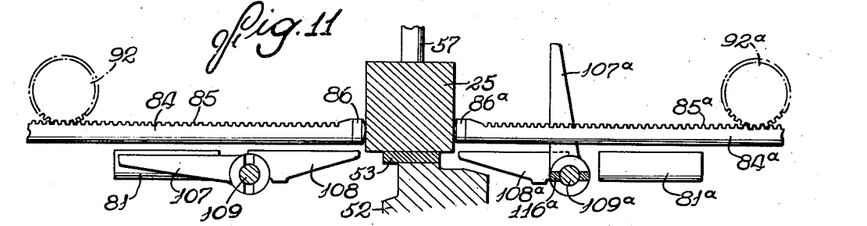

Due to the setting of the cam operated valves V—3 and V—3ª, the left hand transfer mechanism push rods 84 are retracted, while the right hand transfer mechanism push rods 84ª are advanced. Valve V—5 directs pressure fluid to the inner ends of the cylinders 126 and 126ª thus causing the shafts 109 and 109ª of both turning mechanisms to be rocked to a position in which the turning arms 108 and 108ª are horizontal. Since the clutches 115 are disengaged, the arms 107 remain in their normal position as shown in Fig. 10, while the arms 107ª are rocked to a vertical position as shown in this figure. The first billet 25 may now be pushed along the runway 81 to position it for transfer laterally onto the work table.

The billet, having been properly located on the runway against the stop 81ᵇ, the cam shaft 142 may be stepped to its second position. The condition of the various electrical switches is unchanged, but the plunger 102 of valve V—3 is shifted to its alternate position to introduce pressure fluid into the outer end of the cylinder 94 and thus advance the left hand set push rods 84.

The plunger 102ª of valve V—3ª is shifted to an intermediate position in which it blocks the ports to which the line 153 is connected, and connects both ends of the cylinder 94ª to the drain line 154. The push rods 84ª are held in advanced position by the pressure fluid trapped in the rod end of the cylinder 94ª by the resistance offered by the check valve 106ª. Accordingly, the billet 25 is pushed laterally by the push rods 84 until it engages the ends of the push rods 84ª and is thus securely clamped between the two sets of rods. Continued pressure exerted by the push rods 84 continues to advance the billet and force the push rods 84ª back thus moving the piston 93ª toward the inner end of the cylinder 94ª, and exhausting the trapped pressure fluid against the resistance of the check valve 106ª to the drain branch line 154ª and thence to the opposite end of the cylinder 94ª. The force required to push back the rods 84 is determined by the setting of the valve 105ª which can be adjusted as required in a well known manner. The billet is accurately located upon the work table when the push rods 84 reach their limit positions, the exact position being determined by the length of the tips 86. The push rods 84ª cooperate to hold the billet tightly against the tips 86 until the billets are clamped.

Movement of the cam shaft 142 to third position is effective only to close the switch S—3 which energizes solenoid VS—3 and reverses the valve V—2. As a result, pressure fluid is directed into the upper ends of the clamping cylinders 60 and the plungers 57 are thereby forced downwardly to clamp the billet in place upon the work table. The apparatus is now in the condition shown in Fig. 11.

As soon as the work is rigidly clamped in place, the controller is turned to the fourth position in which the plungers of both transfer valves V—3 and V—3ª are shifted to direct pressure fluid into the outer ends of the transfer cylinders 94 and 94ª. Both sets of push rods are therefore retracted.

In the next or fifth position of the controller 141, switches S—2 and S—2ª are opened, de-energizing solenoids VS—2 and VS—2ª and switches S—1 and S—1ª are closed, energizing solenoids VS—1 and VS—1ª. Valves V—1 and V—1ª are accordingly operated to their alternate positions whereby the tool heads 41 and 41ª are advanced to operative position. The valve V—5 is also operated to its alternate position which causes the shafts 109 and 109ª of both turning mechanisms to rotate and turn the arms 108 and 108ª to a vertical position as shown in Fig. 12.

The movement of the shaft 109 above referred to may be utilized conveniently for initiating the table movement at this stage of the operating cycle. For this purpose, the shaft is provided with a cam 155 (Fig. 2) adapted to actuate a feed control switch 156 when the shaft reaches its limit position. It will be understood, of course, that the control switch 156 is interconnected in the control circuit of the metal removing unit so that the movement of the table is initiated only when the other elements of the unit are in condition for such operation. Also, by starting the table after the turnover arms operate, the possibility of one billet lying in contact with another billet positioned on the work table is avoided.

Figure 12:
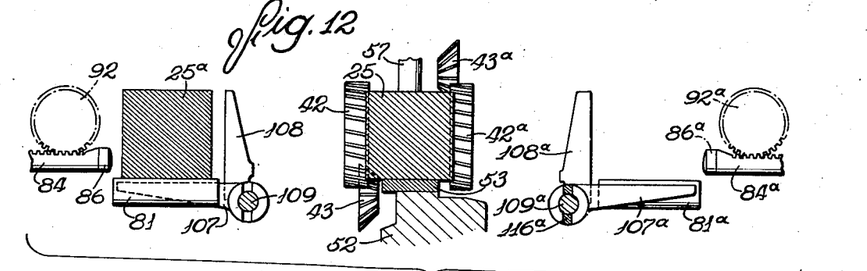
Figure 13:
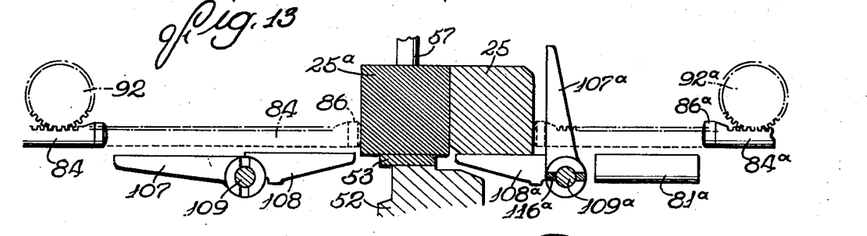

The table is moved first at rapid traverse speed to approach the cutters and then at feed speed which carries the billet 25 into operative relation with the cutters 42, 42ª, 43 and 43ª, which simultaneously scalp opposite side surfaces and bevel diagonally opposite corners of the same (see Fig. 12). While this operation is taking place, the attendant may push the second billet 25ª onto the left hand runway and prepare the same for loading onto the table. After the table has carried the billet past the cutters and stopped, the cam shaft is turned to the sixth position. The switches S—2 and S—2ª are thereby opened and the switches S—1 and S—1ª closed causing shifting of the valves V—1 and V—1ª. The tool heads 41 and 41ª are thus retracted so that the work can be returned to the loading station without danger of being marred by the cutters. The valve V—5 is also operated at this time thus causing the shafts 109 and 109ª to turn the arms 108 and 108ª back to their horizontal position. Due to the disengagement of the clutch 115, the arms 107 remain in horizontal position so that the billet 25ª may be transferred to the work table. The clutch 115ª is, however, engaged and the arms 107ª are raised to vertical position as shown in Fig. 13. As an incident to rotation of the shaft 109, the cam 155 restores the switch 156 (Fig. 8) to its initial position thereby initiating the return of the table.

Upon return of the table, the controller shaft may be stepped to seventh position. Unclamping of the work is thus effected through the opening of the switch S—3 and closure of switch S—4 which reverses the position of the valve V—2.

In the eighth position of the cam shaft, valve V—3ª is operated to reverse position, to advance the right-hand push rods 84ª preparatory to transferring the two billets heretofore delivered to the machine. The cam shaft is then stepped to ninth position in which the plunger 102ª of valve V—3ª is moved back to its intermediate position while the valve V—3 is fully operated to advance the left-hand push rods 84. The billet 25ª is thus transferred to the work table, while the partially machined first billet 25 is pushed through the intermediary of the second billet off from the work table into the right-hand turning mechanism. The push rods 84ª yield at this time due to the action of the check valve 106ª in the hydraulic circuit of the transfer cylinder 94ª.

With the billet 25 properly located on the work table, the cam shaft is stepped to its tenth position in which valve V—2 is set to operate the clamping plungers 57. The apparatus is now in the position shown in Fig. 13. When the cam shaft is stepped to the eleventh position, valves V—3 and V—3ª are set to retract both sets of push rods.

Figure 14:
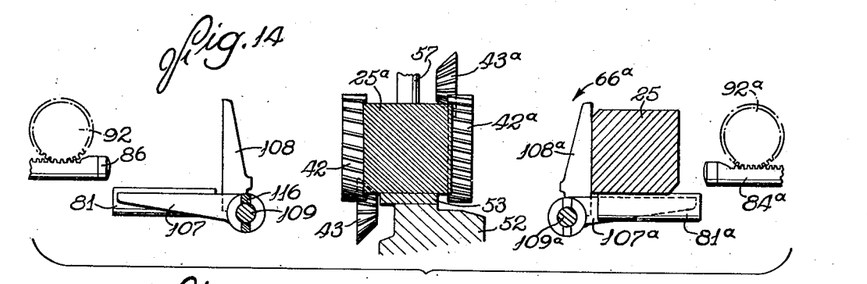
Figure 15:
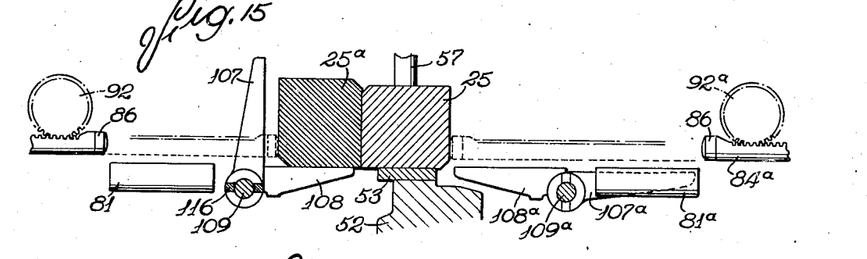

In the twelfth position of the cam shaft, valve V—5 is set so that the shafts 109 and 109ª turn the arms 108 and 108ª to a vertical position. Since billet 25 was previously transferred to the right-hand turning mechanism, it is lifted by the arms 108ª and turned through an angle of ninety degrees in this operation. Shaft 109, on completing its movement, initiates the feed of the table in the manner previously described, whereby the billet 25ª is given its first pass through the metal removing unit. The position of the various mechanisms at this stage of machine cycle is shown in Fig. 14. In this position of the controller shaft, the switches S—5 and S—5ª are closed and the switches S—6 and S—6ª opened. As best shown in Fig. 8, these switches are ineffective due to the open switch 158. This switch is actuated by a cam 157 on the shaft 109ª which, when the arms 108ª reach a vertical position, will close the switch 158 thereby causing the solenoids VS—5 and VS—5ª to be energized and shift their respective valves. In this position, the piston 117ᵃ will be moved outwardly to disengage the clutch 115ᵃ while the piston 117 will be moved inwardly to engage the left hand clutch 115.

The cam shaft is now stepped to thirteenth position in which it causes the shafts 109 and 109ᵃ to turn the arms 108 and 108ᵃ to a horizontal position. Since the clutch 115 is engaged, arms 107 are turned to a vertical position. Arms 107ᵃ, however, remain in a horizontal position so that billet 25 may be returned to the work table by the right-hand transfer mechanism. Also, the heads 41 and 41ᵃ are retracted and the table returned as previously described.

The cam shaft is then stepped to fourteenth position in which the valve V—2 is set to unclamp the billet. With the work table at the loading station, the cam shaft is stepped to fifteenth position, operating the valve V—3 to advance the left-hand set of push rods 84 into engagement with the billet 25ᵃ on the work table. In the sixteenth position of the cam shaft, the plunger 102 of valve V—3 is set in its intermediate position and valve V—3ᵃ is set to advance the right-hand set of push rods 84ᵃ. The latter push the partially machined billet 25 back onto the work table and through the medium of this billet transfer the second partially machined billet 25ᵃ laterally off from the work table onto the left-hand turning mechanism. Push rods 84 yield at this time but exert sufficient back pressure to insure accurate positioning of the billet 25 on the work table due to the action of the check valve 106. The apparatus is now in the condition shown in Fig. 15.

Figure 16:
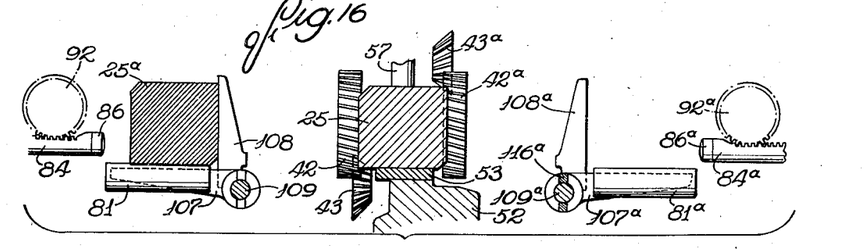

In order to clamp the billet 25 on the work table, the cam shaft is stepped to seventeenth position. In the eighteenth position, both sets of push rods are retracted. In the nineteenth position, the switches S—5 and S—5ᵃ are closed and the switches S—6 and S—6ᵃ are opened and the turning mechanisms operate to raise the arms 108 and 108ᵃ to a vertical position. Billet 25ᵃ is turned through an angle of ninety degrees in this operation and is deposited on the left-hand runway. Shaft 109 starts the feed mechanism, while the shaft 109ᵃ energizes the right-hand clutch 115ᵃ and disengages the left-hand clutch 115, as previously explained, upon the completion of the turning operation, and billet 25 is thus given its second and final pass through the metal removing unit whereby the two remaining side surfaces are scalped and the two remaining corners are beveled. The condition of the apparatus at this time is shown in Fig. 16. At the termination of the feed cycle, the cam shaft is stepped to the twentieth position and the turning arms 108 and 108ᵃ are returned to a horizontal position, the heads retracted, and the table returned. The cam shaft is stepped to its twenty-first or last position to unclamp the billet 25.

Figure 17:
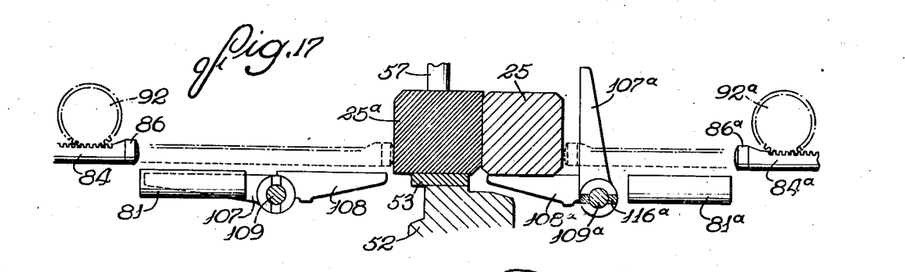
Figure 18:
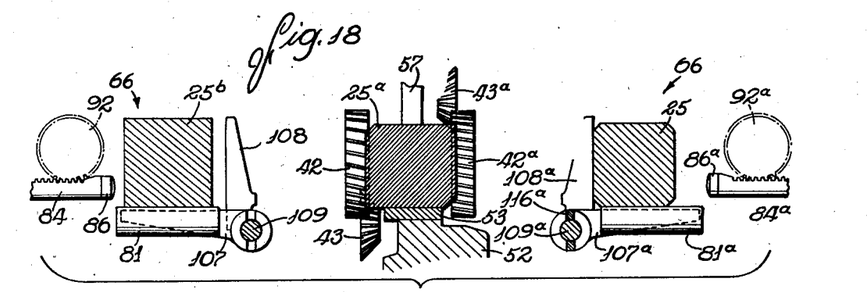

Billet 25 is returned to the loading station completely machined and still supported on the work table, thus marking the end of the first operating cycle of the machine. The next operating cycle is a repetition of the one above described. Briefly, it involves the transfer of the billet 25ᵃ to the work table and the simultaneous transfer of billet 25 to the right-hand turning mechanism as shown in Fig. 17. The turning mechanisms are operated, thus depositing the billet 25 on the right-hand runway from which it may be removed in any suitable manner. In the meantime, a third billet 25ᵇ is moved into position on the left-hand runway to await transfer to the work table.

Figure 19:
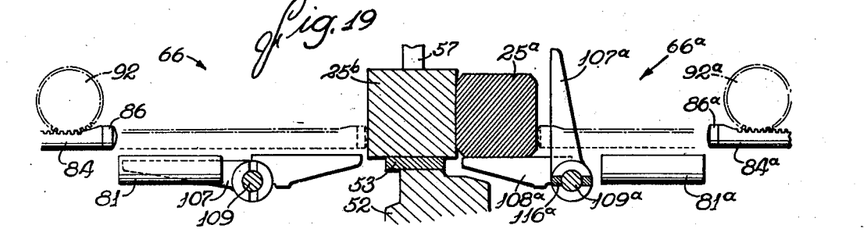

After the second billet 25ᵃ is given its second and final pass through the metal removing unit, it is discharged onto the right-hand turning mechanism while the third billet 25ᵇ is transferred to the work table as shown in Fig. 19. This sequence of operations is repeated until all of the billets are properly surfaced, the billets being machined successively. Each billet is given two passes through the metal removing unit and is turned through an angle of ninety degrees between such passes. All four side surfaces are scalped and all four corners are beveled in this operation and the finished billet is discharged onto the right-hand runway.

Figure 20:
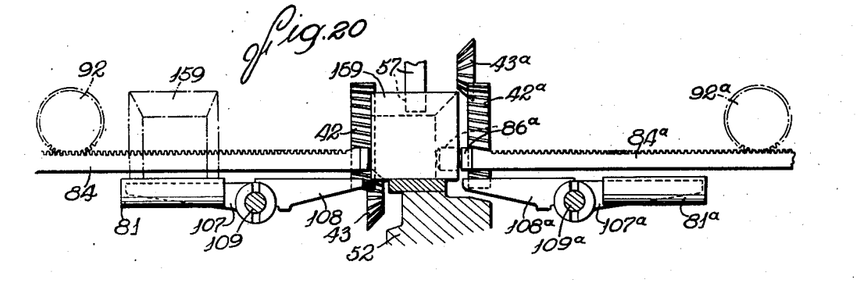
Fig. 20 is a diagrammatic view showing the manner in which longitudinally tapered billets are scalped and beveled by the present machine.

Fig. 20 illustrates the manner of scalping and beveling longitudinally tapered billets such as the billet 159. In this case, one side surface is scalped and one corner is beveled in each passage of the billet through the metal removing unit, there being four such passages with a ninety degree turn of the billet between each passage. One of the tool heads, as for example, the right-hand head, is accordingly set back to an inoperative position. In order to aline the billet properly with respect to the cutters 42 and 43, the push rods 84ᵃ of the right-hand set are provided with tips 86 of progressively increasing lengths. Thus, when the billet is initially placed on the work table, it is held between the two sets of push rods with one face and corner disposed in a plane parallel to the path of the cutters 42 and 43. No change is required in the clamping mechanism since the clamping plungers 57 are provided with individual cylinders and the length of stroke is thus independent. The transfer of the billets between the runways, tables, and turning mechanisms and the turning operations are carried out in the same manner as for straight billets, except that each billet must be turned four times.

It will be apparent from the foregoing that the invention provides a novel and efficient method of handling and scalping large metal billets quickly and efficiently with a minimum number of handling operations. Since one billet may be inserted and prepared for loading onto the table while another billet is being scalped, the necessary positioning and handling operations may be performed on one or more billets while another is occupying the work table. Thus, the equipment is utilized efficiently and a maximum production capacity is obtained.

This application is a division of my copending application, Serial No. 220,467, filed July 21, 1938, now Patent No. 2,238,434.

I claim as my invention:

1. The method of scalping billets which comprises supporting a billet on a work support with one of its longitudinal sides exposed, scalping said side, pushing said billet off from said support through the intermediary of a second billet while leaving the latter billet positioned on said support, scalping a side of the second billet, turning the first billet on its longitudinal axis to expose a different side thereof, pushing the second billet off from said support through the intermediary of said first billet to position the latter on said support, scalping said other side of said first billet, turning the second billet on its longitudinal axis to expose a second side, pushing the first billet off from the support through the intermediary of said second billet and leaving the latter positioned on said support, and scalping the second side of the latter billet.

2. The method of scalping billets which comprises supporting a billet on a work support with one of its longitudinal sides exposed, scalping said side, shifting a second billet laterally in one direction to push the first billet off from said support and position the second billet on said support, scalping a side of the second billet, turning the first billet on its longitudinal axis to expose a different side thereof, shifting the first billet laterally in a direction opposite to said first mentioned direction to push the second billet off from said support and position the first billet on the support, scalping said other side of said first billet, turning the second billet on its longitudinal axis to expose a second side, shifting the second billet laterally to push the first billet off from said support and position the second billet thereon and scalping the second side of the second billet.

3. The method of scalping billets which comprises supporting a billet on a work support with one of its longitudinal sides exposed, scalping said side, shifting a second billet laterally in one direction to push the first billet off from said support and position the first billet on said support, scalping a side of the second billet, turning the first billet on its longitudinal axis to expose a different side thereof, and shifting the first billet laterally in a direction opposite to said first mentioned direction to push the second billet off from said support and position the first billet on the support, scalping said other side of said first billet.

4. The method of scalping billets which includes the steps of supporting a billet in a predetermined position on a work support with one of its longitudinal sides exposed, scalping said side, shifting a second billet laterally to push the first billet off from said support and locate said second billet in said predetermined position on the support, and scalping a side of the second billet.

5. The method of scalping billets which includes the steps of supporting a billet in a predetermined position on a work support with one of its longitudinal sides exposed, scalping said side, shifting a second billet laterally to push the first billet off from said support and locate said second billet in said predetermined position on the support, turning the first billet on its longitudinal axis in a direction away from the second billet to expose the abutting side of the second billet, scalping such side of the second billet, and shifting said first billet reversely against the scalped side of the second billet to move the latter off from said support and position the first billet on the support with a new side exposed for scalping.

6. The method of scalping billets which includes the steps of supporting a billet in a predetermined position on a work support with one side exposed, scalping said side, shifting a second billet laterally to push the first billet off from said support and locate said second billet in said predetermined position, turning the first billet to expose the abutting side of the second billet, and scalping such side of the second billet.

ALEXANDER OBERHOFFKEN.